UNITED STATES PATENT OFFICE.

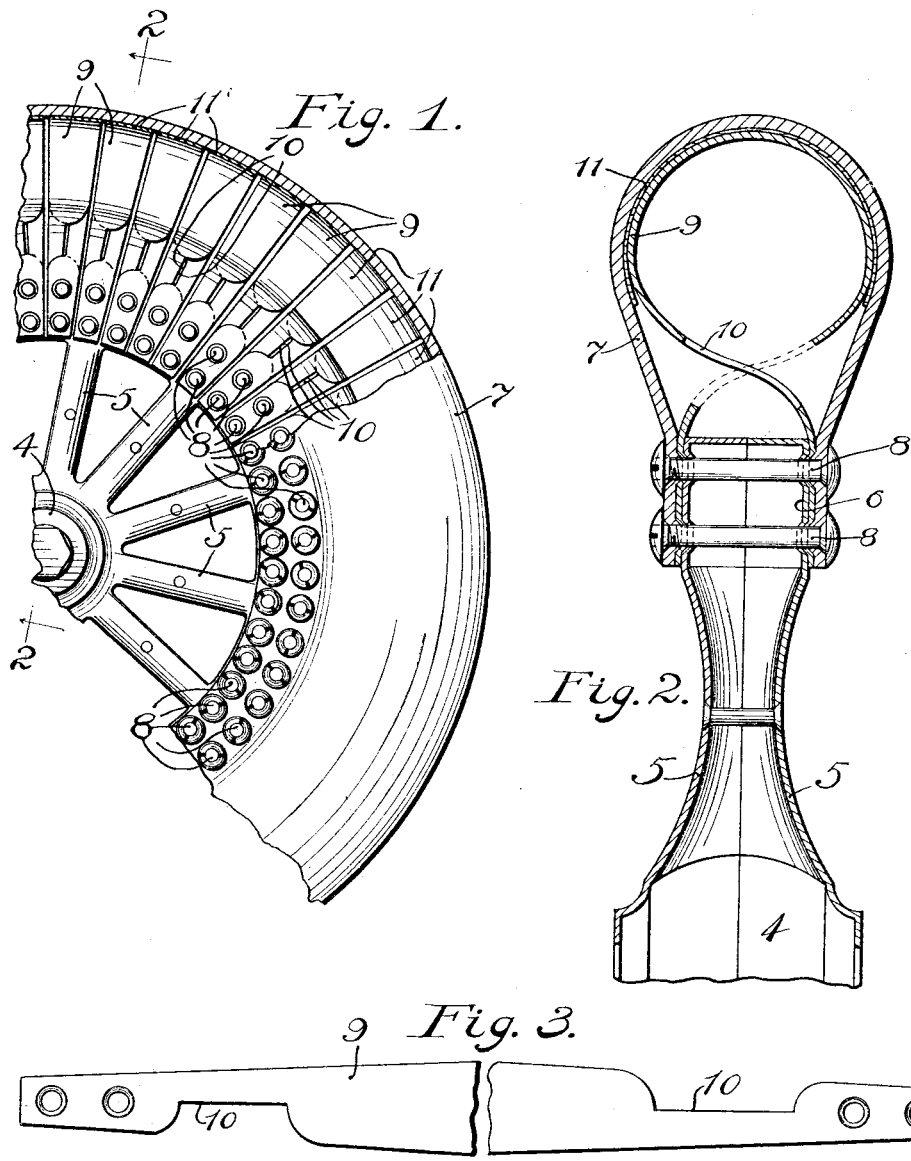

HANS G. A. LUNDQUIST, OF CHICAGO, ILLINOIS, ASSIGNOR OF TWENTY-FIVE AND ONE-HALF ONE-HUNDREDTHS TO WILLIAM HARRIS ABERNATHY AND TWENTY-FIVE AND ONE-HALF ONE-HUNDREDTHS TO JAMES CARROLL ROSS ABERNATHY, BOTH OF TABLE GROVE, ILLINOIS.

RESILIENT TIRE.

1,176,682.     Specification of Letters Patent.     Patented Mar. 21, 1916.

Application filed April 23, 1915. Serial No. 23,419.

*To all whom it may concern:*

Be it known that I, HANS G. A. LUNDQUIST, a citizen of the United States, and a resident of the city of Chicago, county of Cook, and State of Illinois, have invented certain new and useful Improvements in Resilient Tires, of which the following is a specification.

My invention relates to improvements in resilient tires, and has for its object the provision of an improved construction of this character which is simple and efficient in use.

The invention consists in the combinations and arrangements of parts hereinafter described and claimed.

The invention will be best understood by reference to the accompanying drawing forming a part of this specification, and in which, Figure 1 is a partial side view of a wheel equipped with a tire embodying my invention, shown partially in section, Fig. 2, an enlarged partial section taken on line 2—2 of Fig. 1, and Fig. 3, an enlarged plan view of one of a plurality of springs employed in the construction.

The preferred form of construction, as illustrated in the drawing, comprises a sheet metal wheel made up of two separable parts secured together to form a central hub 4, radiating spokes 5 and a rim 6, as indicated. A hollow flexible casing 7, preferably of leather, is arranged around rim 6, the edges of said casing being secured to said rim by means of bolts 8, as shown. Springs 9 are arranged in casing 7 to hold the same yieldingly in distended form. Each of these springs 9 is substantially in the form illustrated in Fig. 3 and is provided with notches 10 in the opposite sides thereof coöperating together to permit of bowing said springs and crossing the ends thereof, as indicated, said notches being deep enough to prevent actual contact between the springs at these points. Thin strips 11 of brass or other suitable material are interposed between the springs 9 and the casing 7 to alleviate friction on said casing.

By this arrangement a resilient tread is provided for the wheel which is very much in the form of an ordinary pneumatic tire and has substantially the same resilient effect without liability to puncture as is the pneumatic tire.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A resilient tire comprising a hollow casing, bowed springs in said casing; and unattached thin strips of metal loosely interposed between said springs and said casing, substantially as described.

2. A resilient tire comprising a rim; a hollow flexible casing having its edges secured to said rim; leaf springs having their ends secured to the sides of said rim and crossed and bowed between their secured points to hold said casing distended, the sides of said springs being provided with coöperating notches to facilitate the crossing thereof; and thin strips of metal loosely interposed between said springs and said casing, substantially as described.

3. The combination with a wheel rim having flat sides, of leaf springs having their ends bolted to said sides, said springs being crossed and bowed between their bolted points; and a hollow flexible casing inclosing said springs, the edges of said casing being also bolted to the flat sides of said rim, the same bolts being employed for securing the springs and casing, substantially as described.

In testimony whereof I have signed my name to this specification in the presence of two subscribing witnesses.

HANS G. A. LUNDQUIST.

Witnesses:
  JOSHUA R. H. POTTS,
  HELEN F. LILLIS.

Copies of this patent may be obtained for five cents each, by addressing the "Commissioner of Patents, Washington, D. C."